United States Patent [19]

Kania

[11] 4,425,732

[45] Jan. 17, 1984

[54] ANIMAL TRAP

[76] Inventor: Tadeusz E. Kania, R.R. #1, Winlaw, British Columbia, Canada

[21] Appl. No.: 274,489

[22] Filed: Jun. 17, 1981

[51] Int. Cl.³ .............................................. A01M 23/30
[52] U.S. Cl. .............................................. 43/81; 43/85
[58] Field of Search ...................... 43/81, 81.5, 82, 83, 43/83.5, 77, 85

[56] References Cited

U.S. PATENT DOCUMENTS

| 472,213 | 4/1892 | Gould ..................................... 43/85 |
| 477,966 | 6/1892 | Steiner .................................... 43/85 |
| 600,156 | 3/1898 | Mast ........................................ 43/85 |
| 714,281 | 11/1902 | Chasse ..................................... 43/85 |
| 2,471,748 | 5/1949 | Horne .................................... 43/81.5 |
| 2,813,369 | 11/1957 | Thomisee ................................ 43/61 |

Primary Examiner—Nicholas P. Godici
Assistant Examiner—Marc Hodak

[57] ABSTRACT

A humane animal trap is disclosed comprising a box having an animal access opening, a trigger lying between the access opening and a bait enclosure and a coil spring consisting of a killing arm inside the box and a setting arm outside the box.

10 Claims, 2 Drawing Figures

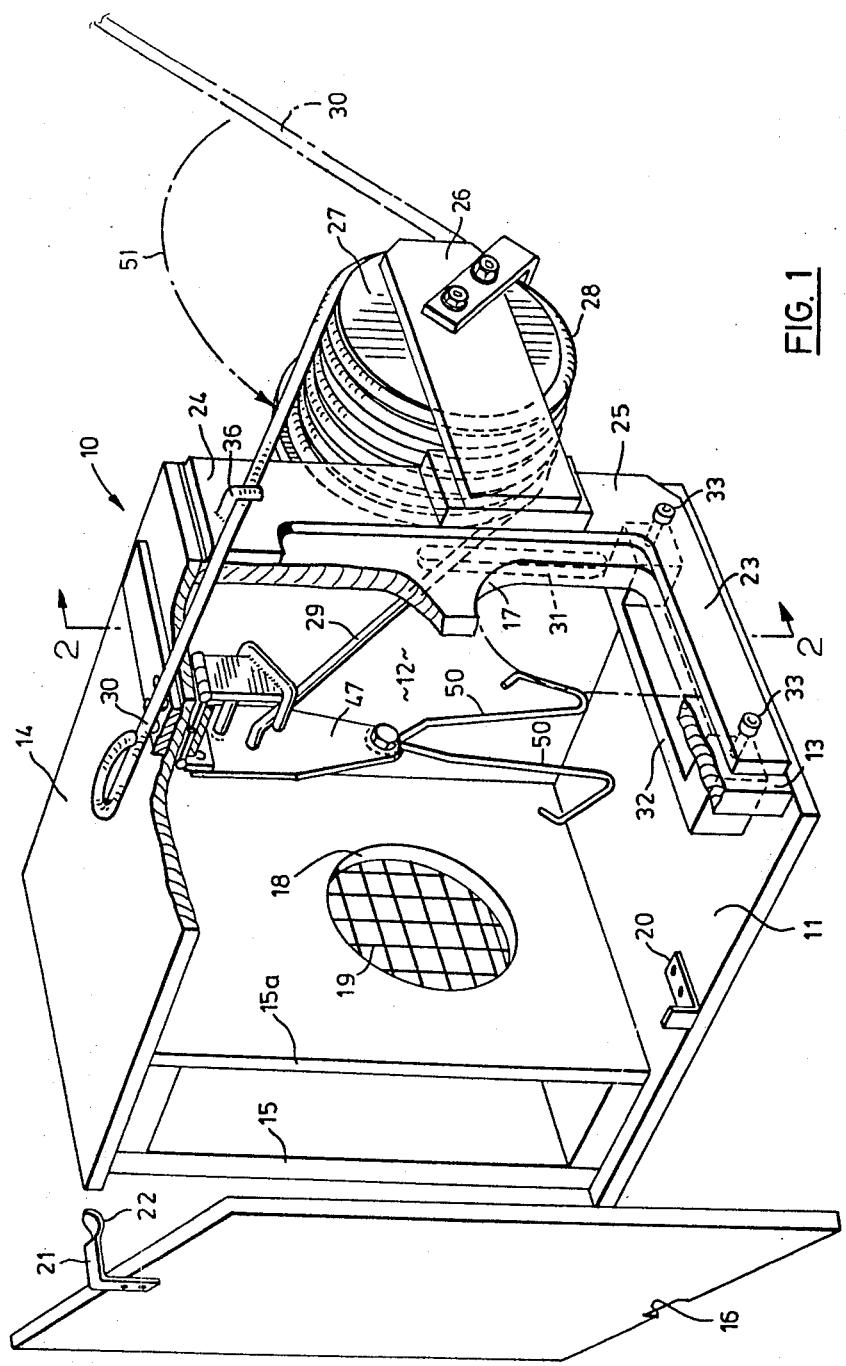

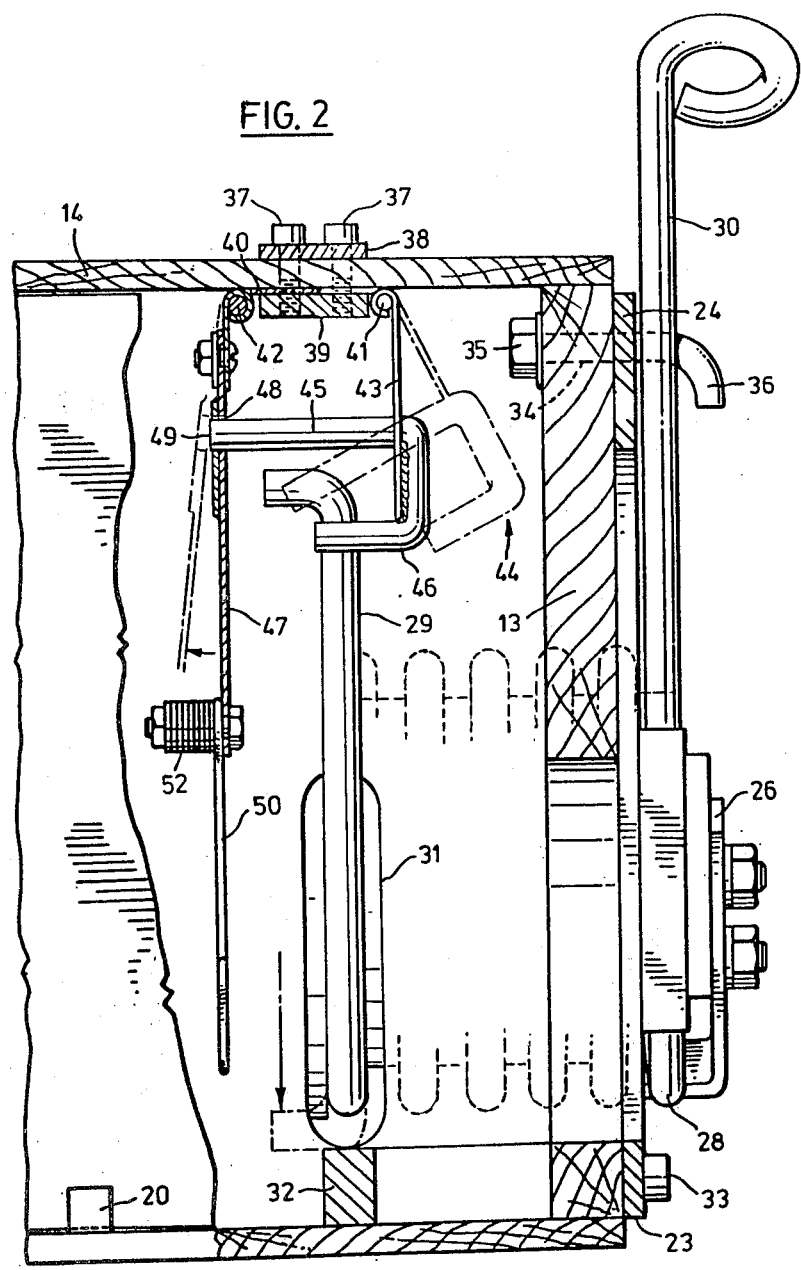

ANIMAL TRAP

FIELD OF THE INVENTION

The present invention relates to a humane animal trap and, in particular, to a humane animal trap which provides a high degree of certainty in killing the animal which it is intended to trap combined with a high degree of safety, reliability and convenience for the trapper.

BACKGROUND OF THE INVENTION

Animal traps of a very wide variety of forms have, from time to time, been proposed in the prior art, experimented with in the field and, in the end, discarded because of one deficiency or another.

What may be called conventional leg hold traps are viewed with disfavour because of their manifest deficiencies. Leg hold traps rely upon the skill of the trapper in properly placing and concealing the traps and are subject to accidental springing. A falling branch can set off a trap rendering it useless for its intended purpose. A passing animal or bird of a kind which it is not intended to trap may, accidentally, be caught which not only causes needless suffering to the animal trapped but, of course, renders the sprung trap incapable of catching the animal for which it was set.

In recent years, other and more sophisicated traps have been developed but the majority of these rely upon the skill of the trapper for the proper placement of the trap in order to ensure that the intended animal will be caught and that the trap will, in fact, effectively capture and kill the animal under conditions which will enable the trapper to obtain a saleable pelt.

An animal trap constructed in accordance with the present invention is substantially free of all of the aforementioned disadvantages and defects. First, it cannot be accidentally sprung by falling branches, twigs or accidental contact. Second, it is highly unlikely that it will be accidentally sprung by animals or birds for which it is not intended.

It is extremely safe to use from the trapper's point of view and its sensitivity can be adjusted in accordance with the requirements of the animal being sought.

Other advantages of the invention will be apparent from the following description of a preferred embodiment when taken in conjunction with the accompanying drawings in which like reference numerals denote like figures in the various views and in which:

FIG. 1 is a perspective view, partly cut away, of an animal trap embodying the present invention, and FIG. 2 is a partial section view taken along line 2—2 of FIG. 1.

DESCRIPTION OF THE PREFERRED EMBODIMENT

Referring now to FIG. 1, the animal trap of the present invention will be seen to embody a box-like structure illustrated generally at 10 and comprising a bottom wall 11, a fixed side wall 12, a front wall 13, a top wall 14 and a double rear wall 15 and 15a and a removable side wall 16.

The front wall 13 is provided with an animal access opening 17. The animal access opening 17 will be of a size determined by the animal for which the trap is intended. Animals such as mink and marten would be provided with animal access openings smaller than traps intended for animals such as fox.

Rear wall 15a is provided with an opening 18 in line with the animal access opening 17 and covered by a screen 19. The space between rear walls 15 and 15a is bait compartment and, as can be seen, when the removable side wall 16 is in position, an animal may not obtain access to the bait within the bait compartment. This provides the trap with the significant advantage that, under no circumstances, can the bait be stolen or otherwise removed from the trap and avoids the necessity of a trapper constantly replenishing the bait in the trap.

The removable side wall 16 is engaged in position by a clip 20 mounted on the bottom wall 11 of the enclosure and a spring 21 having a detent 22 which engages in a depression (not shown) in the upper surface 14 of the box 10.

Securely mounted to the outer surface of the front wall 13 of the box 10 is a metal yoke consisting of a lower arm 23, an upper arm 24 and an integral vertical component 25 joining arms 23 and 24. Extending rearwardly from the component 25 is a metal arm 26 which carries a drum 27 about which is wound a number of convolutions of a spring 28. The spring 28 has tangentially extending free end arms 29 and 30, arm 29 being the killing arm and arm 30 being the setting arm.

The axial extent of the coil of the spring 28 is such that the killing arm 29 extends into the interior of the box through a slot 31 in side wall 12 while the setting arm 30 lies forwardly of the front face of the box by a distance sufficient that it may be forced into the set position as shown in FIG. 1.

Inside the box, adjacent the lower edge of the animal access opening 17 is a striking bar 32 against which the killing arm 29 impacts when the trap is sprung. Bolts such as those shown at 33 pass through the front wall and securely fasten arm 23 to striking bar 32.

Referring now to FIG. 2, the member 24 can be seen to be secured to the front wall of the box by bolts 34 secured by nuts 35 and one of which extends forwardly of the front wall by a distance sufficient to enable it to form a hook 36 for reasons which will be explained below.

Internally of the box, as seen in FIG. 1, is provided the latch for the killing bar and the trigger.

Bolts 37 passing through a backing plate 38 and threaded into a plate 39 securely mount a double hinge mechanism to the lower surface of the upper wall 14 of the box. Stationary hinge plate 40 is provided with a pair of parallel hinge pins 41 and 42. From hinge pin 41 depends hinge plate 43 which carries a J-shaped element 44 consisting of an upper, longer leg 45 and a lower, shorter leg 46. The J-shaped element 44 is free to pivot between the solid line position and the dotted line position of FIG. 2.

The trigger mechanism depends from hinge pin 42 and comprises a plate 47 having an aperture 48 which can receive the end 49 of the longer arm of the J-shaped element. The lower end of the trigger plate 47 is provided with a wire trip member 50 which extends downwardly to lie between the animal access opening 17 and the opening 18 in the rear wall 15a.

Having described the construction of the animal trap of the present invention, its method of setting and operation will now be described.

In order to set the trap, the removable wall 16 is removed and set aside. Killing arm 29 is then moved upwardly so as to be engaged by the shorter arm 46 of the J-shaped member as shown in FIG. 1 and the end 49 of the longer arm 45 of the J-shaped member is inserted in the aperture 48 in the trigger plate 47.

At this point, the setting arm 30 of the spring is in the dotted line position of FIG. 1.

Before the removable wall 16 of the box is replaced in position, final adjustments, if desired, can be made. For example, the extent to which arm 45 extends into trigger plate 47 can be carefully adjusted so as to provide for the desired sensitivity of the trap.

In addition, the spacing between the two spring arms 50 can be adjusted in accordance with circumstances dictated by the animal that is being sought.

Once the adjustments within the box have been performed, the removable wall 16 can be reapplied to the box by engaging the lower edge of the wall 16 with the bracket 20 and engaging the detent 20 of the spring clip 21 with the recess in the upper surface of the upper wall 14.

Setting arm 30 is then grasped and moved in the direction of the arrow 51 until it is engaged beneath the hook 36 as seen in FIG. 1.

This second stage setting operation completes the setting of the trap.

The engagement of the killing arm 29 with the J-shaped member placed initial stress upon the coil spring 28 but the final second stage setting involving the engagement of arm 30 with hook 36 provides the full maximum set of the coil spring.

Attracted by the bait in the bait compartment behind the screen 19, an animal may attempt to enter the access opening 17 in order to gain access to the bait. If the animal is larger than the animal for which the trap is intended, it will be unable to enter the access opening 17 and will be unable to touch the spring elements 50 attached to the trigger plate 47 and will be unable to spring the trap. An animal of the proper size, however, will be able to enter the opening 17 and, in doing so, will touch the spring elements 50, move the trigger plate rearwardly by an amount sufficient to disengage the end 49 of the longer arm 45 of the J-shaped element from the hole 48 in trigger plate 47 and will release the killing arm 29 which will move downwardly with great force to strike the animal.

The distance between the animal access opening and the spring elements 50 can be adjusted in order to provide a reasonable degree of certainty that the killing arm 29 will strike the animal at the most effective point to produce an instantaneous kill. This can be done either by bending the spring elements 50 closer to or further away from the animal access opening or by placing one or more of the washers 52 between the spring elements 50 and the trigger plate 47 upon which they are mounted to adjust the distance between the animal access opening and the spring elements 50.

The impact bar 32 at the bottom of the animal access opening contributes to the effectiveness of the blow delivered by the killing arm 29.

Since the interior of the box is dark and since the darkness of the interior is made virtually complete by the presence of the animal within the animal access opening, the animal cannot see the spring elements 50 and will accordingly, not be suspicious of their presence and will inadvertently touch them in its attempt to gain access to the bait behind the screen 19.

When an animal has been caught, a trapper can release the animal simply by disengaging the setting arm 30 from the hook 36 and permitting it to move to the dotted line position of FIG. 1. At that point, relatively little pressure is required in order to lift killing arm 29 and release the animal. Once the animal has been released, the trap can immediately be re-set since the bait will remain intact within the bait compartment behind the screen 19.

If, during the setting operation, the trap should inadvertently spring, the trapper's hands are, at all times, outside the box and there is no possibility of injury as a result of an unexpected springing of the trap.

As can be seen from the foregoing description, a trap has been devised which is effective, efficient and humane and which possesses a high degree of certainty in killing an animal entering the trap and a high degree of selectivity over the animals which can gain access to the trap and be caught thereby.

Although a preferred embodiment has been described with reference to the accompanying drawings, it is apparent that details of construction, choice of materials and other unimportant aspects of the construction can be varied within the scope of the invention and the appended claims.

I claim:

1. An animal trap comprising an enclosure and;
   (a) an animal access opening in a front wall of the enclosure and a bait compartment adjacent a rear wall thereof;
   (b) a coil spring carried by a bracket secured to the exterior of said front wall of the box and coiled about an axis normal to the front wall and having tengentially extending free end arms;
   (c) a trigger and latch assembly within the enclosure;
   (d) the first of said free end arms extending into the enclosure and adapted to be releasably engaged by the latch in a set position above the animal access opening;
   (e) the second of said free end arms adapted to be moved from a relaxed position to a set position in which the coil spring is under maximum stress, and
   (f) engagement means between the trigger and the latch which, upon movement of the trigger, releases the latch and allows the first of said free end arms to move across the animal access opening to impact on the floor of the enclosure adjacent the lower edge of the animal access opening.

2. An animal trap as claimed in claim 1 wherein the first of said free end arms extends into the enclosure through a slot in a side wall.

3. An animal trap as claimed in claim 1 wherein the trigger depends from and is pivotally mounted on the roof of the enclosure and extends downwardly to a position in which it will be touched by an animal extending its head into the animal access opening.

4. An animal trap as claimed in claim 3 wherein the distance from the animal access opening to the trigger is adjustable.

5. An animal trap as claimed in claim 1 wherein the latch is pivotally mounted to the roof of the enclosure and has an arm, the end of which engages an aperture in the trigger in which position a second arm is held in a position to engage said first free end arm of the coil spring in its set position.

6. An animal trap as claimed in claim 1 wherein means are carried by the front wall of the enclosure to engage the second free end arm of the coil spring and secure it in its set position in which the coil spring is under maximum stress.

7. An animal trap as claimed in claim 1 wherein the bait compartment is separated from the interior of the enclosure by a wall having a screened aperture so that an animal may not gain access to the bait.

8. An animal trap as claimed in claim 2 wherein the enclosure has a removable side wall so that access to the interior of the enclosure is available to set the latch and trigger.

9. An animal trap as claimed in claim 1 wherein the floor of the enclosure is reinforced adjacent the lower edge of the animal access opening where it is impacted by the first free end arm of the coil spring.

10. An animal trap as claimed in claims 4 or 5 wherein the trigger and latch are pivoted to the roof of the enclosure about axes that are parallel.

* * * * *